(12) United States Patent
Higashino et al.

(10) Patent No.: US 6,663,924 B1
(45) Date of Patent: Dec. 16, 2003

(54) PACKAGING MATERIAL FOR MOLDING MATERIAL AND PARTS FOR SEMICONDUCTOR PRODUCTION APPARATUSES, METHOD FOR PACKAGING BY USING SAME AND PACKAGED MOLDING MATERIAL AND PARTS FOR SEMICONDUCTOR PRODUCTION APPARATUSES

(75) Inventors: Katsuhiko Higashino, Settsu (JP); Masanori Hasegawa, Settsu (JP); Tsuyoshi Noguchi, Settsu (JP); Mitsuru Kishine, Settsu (JP)

(73) Assignee: Daiken Industries, Ltd., Osaka (JP)

( * ) Notice: Subject to any disclaimer, the term of this patent is extended or adjusted under 35 U.S.C. 154(b) by 0 days.

(21) Appl. No.: 09/743,712

(22) PCT Filed: Jul. 14, 1999

(86) PCT No.: PCT/JP99/03790

§ 371 (c)(1),
(2), (4) Date: Jan. 16, 2001

(87) PCT Pub. No.: WO00/03928

PCT Pub. Date: Jan. 27, 2000

(30) Foreign Application Priority Data

Jul. 17, 1998 (JP) .......................................... 10/203842
Jan. 12, 1999 (JP) .............................................. 11-5809

(51) Int. Cl.[7] .......................... B65D 85/00; B65D 85/86
(52) U.S. Cl. ...................... 428/34.1; 428/35.7; 53/396; 206/701; 206/720
(58) Field of Search ............................... 206/701, 720; 53/396; 428/35.3, 35.4, 35.8, 36.6, 143, 323, 421, 422, 430, 441, 457, 458, 461, 428, 480, 938, 34.1, 35.7

(56) References Cited

U.S. PATENT DOCUMENTS

| 3,442,686 A | | 5/1969 | Jones ........................ 428/336 |
| 3,925,277 A | * | 12/1975 | Lampe ........................ 524/863 |
| 4,756,414 A | * | 7/1988 | Mott ........................... 206/720 |
| 5,085,904 A | * | 2/1992 | Deak et al. .................. 427/571 |
| 5,687,542 A | * | 11/1997 | Lawecki et al. .............. 53/122 |
| 5,792,550 A | * | 8/1998 | Phillips et al. .............. 428/336 |
| 5,894,742 A | * | 4/1999 | Friedt ......................... 62/50.2 |

FOREIGN PATENT DOCUMENTS

| JP | 57-52267 B | 11/1982 |
| JP | 63-272542 | 11/1988 |
| JP | 6-6367 B | 1/1994 |
| JP | 7-330020 A | 12/1995 |
| JP | 7-330039 A | 12/1995 |
| JP | 8-48370 | 2/1996 |
| JP | 8-175519 A | 7/1996 |
| JP | 10-116889 A | 5/1998 |
| WO | WO IB 97-14628 A1 | 4/1997 |

OTHER PUBLICATIONS

Product brochure of TOYOBO "Industrial Films" (Jan., 1999).

English translation of International Preliminary Examination Report for PCT/JP99/03790 dated Oct. 16, 2000.

International Search Report for PCT/JP99/03790 dated Oct. 19, 1999.

* cited by examiner

Primary Examiner—Ramsey Zacharia
(74) Attorney, Agent, or Firm—Sughrue Mion, PLLC

(57) ABSTRACT

To provide a packaging material being capable of maintaining a highly clean state, wherein the number of fine particles having a particle size of not less than 0.2 μm and being present on its surface facing an article to be packaged is not more than 5,000/cm$^2$, a steam permeation degree at 40° C. at 90% RH is not more than 30 g/cm$^2$·24 hr, a total amount of gas (excluding steam) to be generated when heating at 80° C. for 15 minutes is not more than 5 ppm and a total amount of water to be generated when heating at 80° C. for 30 minutes is not more than 13 ppm.

13 Claims, No Drawings

PACKAGING MATERIAL FOR MOLDING MATERIAL AND PARTS FOR SEMICONDUCTOR PRODUCTION APPARATUSES, METHOD FOR PACKAGING BY USING SAME AND PACKAGED MOLDING MATERIAL AND PARTS FOR SEMICONDUCTOR PRODUCTION APPARATUSES

TECHNICAL FIELD

The present invention relates to a packaging material being capable of packaging a molding material such as unvulcanized kneaded composition and parts such as a sealing material for semiconductor production apparatuses in a highly clean state, and a method for packaging.

BACKGROUND ART

In manufacturing semiconductor elements, very high cleanliness is required, and the requirements for high cleanliness range over not only management of a production process of semiconductors but also semiconductor production apparatuses and parts thereof. If the parts of semiconductor production apparatuses are cleaned after built in the equipment, a degree of possible cleanliness is limited. Such parts are required to have been cleaned highly before built in the equipment.

Also cleanliness is required similarly in a molded article such as a sealing material for semiconductor production apparatuses which the present invention can be particularly suitably applied to. The present applicants have attained high cleanliness of the sealing material itself by employing a special method of cleaning the sealing material (JP-A-10-77781, JP-A-10-161988).

However unvulcanized kneaded composition and sealing materials are delivered after packaged. Therefore even if the unvulcanized kneaded composition and sealing materials are cleaned, if they are contaminated by a packaging material when or after packaged, an object of keeping them clean cannot be attained.

Hitherto low density polyethylene (LDPE) has been used widely as a packaging material for sealing materials from the viewpoint of sealing property and easy handling. However LDPE could not be made clean up to such a high cleanliness as required in the field of production of semiconductors.

Therefore the present inventors have pursued causes for contamination by a packaging material and found that in addition to a contamination by fine particles on a surface of the packaging material, a contamination derived (eluting) from a material of the packaging material is a great cause and also a contamination coming from outside environment cannot be ignored. The present inventors have made intensive studies on a packaging material and a method of packaging capable of coping with the respective causes for contamination, and thus completed the present invention.

DISCLOSURE OF INVENTION

Namely the present invention relates to the packaging material for molding materials and parts for semiconductor production apparatuses which satisfies at least one of requirements that (1) the number of fine particles having a particle size of not less than 0.2 $\mu$m and being present on the surface of the packaging material facing an article to be packaged is not more than 5,000/cm$^2$, (2) a steam permeation degree at 40° C. at 90% RH is not more than 30 g/cm$^2$·24 hr, (3) a total amount of gas (excepting steam) generated when heating at 80° C. for 15 minutes is not more than 5 ppm and (4) a total amount of moisture generated when heating at 80° C. for 30 minutes is not more than 13 ppm.

When the cleaned molding materials or parts for semiconductor production apparatuses are sealed in the packaging material of the present invention, allowed to stand for 24 hours in an environment of 40° C. and 90% RH and then unpacked, as compared with the cleaned molding material or parts before packaged, a percentage of an increase in the number of fine particles having a particle size of not less than 0.2 $\mu$m and being present on the surface of the molding materials or parts is not more than 150%, a percentage of an increase in an amount of moisture generated when heating the molding materials or parts at 300° C. for 30 minutes is not more than 100% and a percentage of an increase in a total amount of gas (excepting steam) generated when heating them at 200° C. for 15 minutes is not more than 100%.

BEST MODE FOR CARRYING OUT THE INVENTION

The packaging material for molding materials and parts for semiconductor production apparatuses satisfies at least one of the above-mentioned specific requirements.

First those specific requirements and measuring methods therefor are explained below.

(Specific Requirement 1) The number of fine particles having a particle size of not less than 0.2 $\mu$m and being present on the surface of the packaging material facing an article to be packaged (unvulcanized kneaded composition or parts) must be not more than 5,000/cm$^2$. In case where the packaging material is a vapor deposition-treated film or sheet or a laminated material mentioned hereinafter, fine particles being present on the surface of innermost layer facing an article to be packaged should satisfy this requirement.

A measuring method is such that a sample of packaging material having a surface area of 10 cm$^2$ is dipped in 1,000 ml of ultra pure water, followed by vibrating for five minutes at an amplitude of 10 cm at the number of vibrations of 2 times/sec with a vibrator (TS-4 available from Taiyo Kagaku Kogyo Kabushiki Kaisha), allowing to stand for 20 minutes and then measuring the number of fine particles having a particle size of not less than 0.2 $\mu$m with a submerged particle counter (available from KABUSHIKI KAISHA LION).

The number of fine particles can be reduced, for example, by wet cleaning method of washing with a washing chemical (ultra pure water, acid, alkali, or the like), a method of spraying a high purity compressed gas, or the like method. The less the fine particles are, the better. The number of fine particles is preferably not more than 4,000/cm$_2$, more preferably not more than 3,000/cm$^2$.

(Specific Requirement 2) A steam permeation degree at 40° C. at 90% RH must be not more than 30 g/cm$^2$·24 hr.

A measuring method is such that according to ASTM E-96, a sample of packaging material is fixed on a moisture permeable cup in which water is put, the cup is allowed to stand for 24 hours in an air-conditioned room of 40° C. and 90% RH and then a weight reduction of water is measured.

A steam permeation degree is used for evaluation of water penetration from the outside of the packaging material. The smaller, the better. If water adheres to an article to be packaged, particularly parts for semiconductor production apparatuses, it has an adverse effect on a semiconductor production process. Examples of the packaging material satisfying such a specific requirement are, for instance, one of films of polyester resins such as polyethylene terephthalate (PET), polybutylene terephthalate (PBT), polyethylene naphthalate (PEN) and polybutylene naphthalate (PBN); olefin resins such as polypropylene (OPP), polyvinyl chloride (PVC) and polyvinylidene chloride (PVDC); and fluorine-containing resins such as polychlorotrifluoroethylene (PCTFE), polytetrafluoroethylene (PTFE), tetrafluoroethylene-perfluoro(alkyl vinyl ether) copolymer (PFA), tetrafluoroethylene-hexafluoropropylene copolymer (FEP), tetrafluoroethylene-ethylene copolymer (ETFE), polyvinylidene fluoride (PVDF) and polyvinyl fluoride (PVF), or a laminated film comprising two or more thereof. Also even such resin films as polyamide and rayon having a large degree of steam permeation can be used if the steam permeation degree is reduced by subjecting them to vapor deposition with silicon oxide, aluminum or aluminum oxide or by laminating a resin film having a small degree of steam permeation such as an aluminum foil or polyvinylidene chloride.

A steam permeation degree is preferably not more than 25 $g/cm^2 \cdot 24$ hr, more preferably not more than 15 $g/cm^2 \cdot 24$ hr.

A thickness of the film or laminated film is optionally selected so that the steam permeation degree is as mentioned above. The thickness is usually not more than 100 $\mu$m, preferably not more than 70 $\mu$m from the viewpoint of easy handling.

(Specific Requirement 3) A total amount of gas (excepting steam) generated when heating at 80° C. for 15 minutes must be not more than 5 ppm.

A measuring method is such that a sample of packaging material (1 g) is put in a seal tube and heated at 80° C. for 15 minutes. A generated gas is collected in a trap tube cooled to –40° C. with liquid nitrogen and then rapidly heated. Then measurement is made with gas chromatograph (GC-14A available from Shimadzu Corporation, Column: UA-5 of Shimadzu Corporation). Then a total amount of generated gas is calculated from a peak area of the obtained chart. In this method, steam is not measured as a gas.

(Specific Requirement 4) A total amount of moisture generated when heating at 80° C. for 30 minutes must be not more than 13 ppm.

An amount of moisture generated when heating a sample of packaging material (1 g) at 80° C. for 30 minutes is measured with Karl Fischer type water meter (AQS-720 available from Hiranuma Kabushiki Kaisha).

While the above-mentioned Specific Requirements 1 and 2 relate to reduction of contamination resulting from causes other than the packaging material, the Specific Requirements 3 and 4 are intended for reduction of contamination inherent in the packaging material. Namely to various components constituting the packaging material, particularly to synthetic resins are blended low molecular weight substances and various additives for improving processability and stability, and it was found that when the packaging material is stored at room temperature or when it is heated, various gases are generated and becomes droplets to adhere to the packaging material, which causes contamination. Generated gases and moisture vary depending on kind of resin, processing method, kind of additives, and the like. For example, dioctyl phthalate, dibutyl phthalate, and the like are generated in a large amount. Based on this finding, the present inventors have found that a higher cleanliness can be achieved by inhibiting amounts of gas generation and moisture generation of the packaging material to not more than 5 ppm (when heating at 80° C. for 15 minutes) and not more than 13 ppm (when heating at 80° C. for 30 minutes), respectively.

Examples of materials satisfying those specific requirements are, for instance, PET, PBT, PEN, PBN, PVDC, PCTFE, PTFE, PFA, FEP, ETFE, PVDF, PVF, and the like. Particularly preferred are polyester resins such as PET, PBT, PEN and PBN; fluorine-containing resins such as PCTFE, PTFE, PFA, FEP, ETFE, PVDF and PVF; and the like, in which a total amount of gas generation is not more than 2 ppm. Also those resin films subjected to vapor deposition with silicon oxide, aluminum or aluminum oxide or laminated with an aluminum foil can be used.

Packaging materials satisfying at least one of the above-mentioned four specific requirements, preferably Specific Requirements 1 and 3, more preferably Specific Requirements 1, 3 and 4 are suitable for molding materials and parts for semiconductor production apparatuses which are required to have a very high cleanliness. Examples of the packaging materials satisfying those specific requirements are, for instance, films of polyester resins such as PET, PBT, PEN, PBN and PVDC; films of fluorine-containing resins such as PCTFE, PTFE, PFA, FEP, ETFE, PVDF and PVF; and the like. When molding materials and parts for semiconductor production apparatuses are required to be prevented from water strictly, it is further preferable that a steam permeation degree at 40° C. at 90% RH is not more than 1 $g/cm^2 \cdot 24$ hr, especially not more than 0.2 $g/cm^2 \cdot 24$ hr. Examples of the packaging material satisfying those specific requirements are films obtained by subjecting the above-mentioned resin films being small in a steam permeation degree to vapor deposition with silicon oxide, aluminum or aluminum oxide or laminated films obtained by laminating an aluminum film or the like to the above-mentioned resin films.

The packaging material of the present invention for molding materials and parts for semiconductor production apparatuses can be obtained by forming the above-mentioned resin materials into a film and if necessary, the film is subjected to vapor deposition or lamination and then washing with ultra pure water or a chemical.

The present invention further relates to the method of packaging by using the packaging material of the present invention for molding materials and parts for semiconductor production apparatuses. The packaging material of the present invention can be made into various forms depending on the form of an article to be packaged. For example, when packaging O-rings or the like which are sealing materials for semiconductor production apparatuses, the packaging material may be formed into a bag or foil. Also O-rings can be packaged by putting it between two sheets of packaging materials. In any forms, it is necessary to finally seal the package. Therefore it is necessary that the side of the packaging material facing an article to be packaged can be sealed, and if possible, that the sealing can be done without using an adhesive which may become a new contaminating source. Examples of the sealing method capable of sealing to a high degree without using an adhesive are, for instance, heat-seal method by thermo-fusing, ultrasonic wave sealing method of joining by vibrating with ultrasonic waves, high frequency sealing method by high frequency heating, and the like. Those methods can be employed optionally depending on kind and form of packaging material so that gases and particles should not be generated at sealing and an article to be packaged should not be contaminated.

Also when an elastomer material is kneaded and formed into a final product, there is a case where it is stored or transported temporarily in unvulcanized state. The packaging material and packaging method of the present invention can be suitably used for packaging of unvulcanized green rubbers of elastomer or molding materials such as kneaded compositions thereof with additives for vulcanization.

In order to achieve a high cleanliness, it is necessary to keep a packaging environment in a clean state. In the present invention a packaging work is carried out in an environment of highly pure gas atmosphere. In that case, it is preferable to carry out the packaging work with feeding pressurized highly pure gas into the packaging material. As the highly pure gas, commercially available high purity inert gases such as nitrogen gas and helium gas can be used.

The molding materials and parts for semiconductor production apparatuses which are required to have a very high cleanliness may be packaged double, triple or more by using two sheets or three or more sheets of the above-mentioned packaging materials, though it depends on a degree of cleanliness required for a product to be packaged. In that case, it is more preferable to use different kinds of packaging materials than to use the same kinds of packaging materials.

When the cleaned molding materials or parts for semiconductor production apparatuses are sealed in the packaging material of the present invention, allowed to stand for 24 hours in an environment of 40° C. and 90% RH and then unpacked, as compared with the cleaned molding materials or parts before packaged, a percentage of an increase in the number of fine particles having a particle size of not less than 0.2 $\mu$m and being present on the surface of the molding materials or parts can be reduced to not more than 150%, preferably not more than 130%, a percentage of an increase in an amount of water generated when heating the molding materials or parts at 300° C. for 30 minutes can be reduced to not more than 100%, preferably not more than 95% and a percentage of an increase in a total amount of gas (excepting steam) generated when heating at 200° C. for 15 minutes can be reduced to not more than 100%, preferably not more than 90%. The above-mentioned comparison is based on the cleaned molding materials or parts for semiconductor production apparatuses before packaged, in which the number of adhering fine particles having a particle size of not less than 0.2 $\mu$m is not more than 200,000/cm$^2$, the amount of moisture generated when heating at 300° C. for 30 minutes is not more than 200 ppm and a total amount of gas (excepting steam) generated when heating at 200° C. for 15 minutes is not more than 2 ppm.

The number of fine particles on the parts such as a sealing material is measured by dipping a sample of O-ring (AS-568A-214) in 1,000 ml of ultra pure water, vibrating for five minutes, allowing it to stand for 20 minutes and then counting the number of fine particles having a particle size of not less than 0.2 $\mu$m with a submerged particle counter (available from KABUSHIKI KAISHA LION). Also the number of fine particles of a molding material such as unvulcanized kneaded composition (compound) can be measured in the same manner.

The amount of moisture generated when heating the O-ring (AS-568A-214) at 300° C. for 30 minutes is measured with Karl Fischer type moisture meter (AQS-720 available from Hiranuma Kabushiki Kaisha). Also an amount of moisture generated from the unvulcanized kneaded composition (compound) can be measured in the same manner.

The method of measuring an amount of generated gas (excepting steam) is carried out by putting a sample of the O-ring (AS-568A-214) in a seal tube, heating at 200° C. for 15 minutes, collecting a generated gas in a trap tube cooled to −40° C. with liquid nitrogen, rapidly heating and then measuring with gas chromatograph (GC-14A available from Shimadzu Corporation, Column: UA-5 of Shimadzu Corporation). Then a total amount of generated gas is calculated from a peak area of the obtained chart. In this method, steam is not measured as a gas.

Non-restricted examples of the parts for semiconductor production apparatuses which are required to be highly clean and are to be packaged with the packaging material of the present invention are, for instance, sealing materials for semiconductor production apparatuses as mentioned above such as O-ring, square ring, gasket, packing, oil seal, bearing seal and lip seal; parts for semiconductor production apparatuses such as diaphragm, hose, tube, wafer carrier and various rubber rolls; and the like.

Examples of the molding material are the above-mentioned unvulcanized kneaded compositions (compounds) which can be packaged in various forms, for example, plate form, bulk form, and the like suitable for storing and transporting. Non-restricted examples of such unvulcanized kneaded compositions are, for instance, unvulcanized fluorine-containing elastomer and silicone elastomer, to which a crosslinking agent, crosslinking aid, filler, or the like has been added if necessary.

In the present invention, the semiconductor production apparatuses are not limited particularly to equipment for manufacturing semiconductors and encompass whole manufacturing equipment used in the field of semiconductors where a high degree of cleanliness is required, such as equipment for manufacturing a liquid crystal panel and plasma panel.

Examples of the semiconductor manufacturing equipment are as follows.

(1) Etching system
    Dry etching equipment
        Plasma etching machine
        Reactive ion etching machine
        Reactive ion beam etching machine
        Sputter etching machine
        Ion beam etching machine
    Wet etching equipment
    Ashing equipment (2) Cleaning system
    Dry etching cleaning equipment
        UV/O$_3$ cleaning machine
        Ion beam cleaning machine
        Laser beam cleaning machine
        Plasma cleaning machine
        Gas etching cleaning machine
    Extractive cleaning equipment
        Soxhlet extractive cleaning machine
        High temperature high pressure extractive cleaning machine
        Microwave extractive cleaning machine
        Supercritical extractive cleaning machine (3) Exposing system
    Stepper
    Coater and developer (4) Polishing system
    CMP equipment (5) Film forming system
    CVD equipment
    Sputtering equipment (6) Diffusion and ion implantation system
    Oxidation and diffusion equipment
    Ion implantation equipment The present invention is then explained by means of examples, but is not limited to them.

PACKAGING MATERIAL 1

A 25 μm thick film of polyethylene terephthalate (PET) (TOYOBO E5100 available from Kabushiki Kaisha Toyobo) was wiped with a dust-free paper impregnated with ultra pure water which has a metal content of not more than 1.0 ppm and does not contain more than 300 fine particles of not less than 2 μm to give Packaging Material 1 of the present invention. In that case, after wiping with the dust-free paper, the film was dried by blowing high purity nitrogen gas thereto. The number of fine particles (particles of not less than 0.2 μm, hereinafter the same) of Packaging Material 1 was 1,500/cm$^2$, a steam permeation degree was 22.0 g/cm$^2$·24 hr and an amount of generated gas was 0.0 ppm. An amount of moisture generated from Packaging Material 1 was 10.1 ppm.

PACKAGING MATERIAL 2

Packaging Material 1 was dipped in ultra pure water, followed by shaking for 15 minutes. Then Packaging Material 1 was dried by blowing high purity nitrogen gas thereto to give Packaging Material 2. The number of fine particles of Packaging Material 2 was 300/cm$^2$, a steam permeation degree was 22.0 g/cm$^2$·24 hr, an amount of generated gas was 0.0 ppm and an amount of generated moisture was 10.1 ppm.

PACKAGING MATERIAL 3

A 25 μm thick film of polychlorotrifluoroethylene (PCTFE) (available from DAIKIN INDUSTRIES, LTD.) was wiped with a dust-free paper impregnated with ultra pure water to give Packaging Material 3 of the present invention. In that case, after wiping with the dust-free paper, the film was dried by blowing high purity nitrogen gas thereto. The number of fine particles of Packaging Material 3 was 1,600/cm$^2$, a steam permeation degree was 0.7 g/cm$^2$·24 hr, an amount of generated gas was 0.2 ppm and an amount of generated moisture was 0.0 ppm.

PACKAGING MATERIAL 4

Packaging Material 3 was dipped in ultra pure water, followed by shaking for 15 minutes. Then Packaging Material 3 was dried by blowing high purity nitrogen gas thereto to give Packaging Material 4. The number of fine particles of Packaging Material 4 was 500/cm$^2$, a steam permeation degree was 0.7 g/cm$^2$·24 hr, an amount of generated gas was 0.2 ppm and an amount of generated moisture was 0.0 ppm.

PACKAGING MATERIAL 5

A 25 μm thick PET film subjected to vapor deposition with silicon oxide (available from Kabushiki Kaisha Sanei) was wiped with a dust-free paper impregnated with ultra pure water to give Packaging Material 5 of the present invention. In that case, after wiping with the dust-free paper, the film was dried by blowing high purity nitrogen gas thereto. The number of fine particles of Packaging Material 5 was 2,000/cm$^2$, a steam permeation degree was 0.3 g/cm$_2$·24 hr, an amount of generated gas was 0.0 ppm and an amount of generated moisture was 11.2 ppm.

PACKAGING MATERIAL 6

A 25 μm thick PET film laminated with an aluminum foil (available from KABUSHIKI KAISHA SANEI KAKEN) was wiped with a dust-free paper impregnated with ultra pure water to give Packaging Material 6 of the present invention. In that case, after wiping with the dust-free paper, the film was dried by blowing high purity nitrogen gas thereto. The number of fine particles of Packaging Material 6 was 1,800/cm$^2$, a steam permeation degree was 0.0 g/cm$^2$·24 hr, an amount of generated gas was 0.0 ppm and an amount of generated moisture was 9.8 ppm.

PACKAGING MATERIAL 7

A 25 μm thick PCTFE film subjected to vapor deposition with silicon oxide was wiped with a dust-free paper impregnated with ultra pure water to give Packaging Material 7 of the present invention. In that case, after wiping with the dust-free paper, the film was dried by blowing high purity nitrogen gas thereto. The number of fine particles of Packaging Material 7 was 2,100/cm$^2$, a steam permeation degree was 0.3 g/cm$^2$·24 hr, an amount of generated gas was 0.2 ppm and an amount of generated moisture was 1.1 ppm.

PACKAGING MATERIAL 8

A 25 μm thick PCTFE film laminated with an aluminum foil was wiped with a dust-free paper impregnated with ultra pure water to give Packaging Material 8 of the present invention. In that case, after wiping with the dust-free paper, the film was dried by blowing high purity nitrogen gas thereto. The number of fine particles of Packaging Material 8 was 1,900/cm$^2$, a steam permeation degree was 0.0 g/cm$^2$·24 hr, an amount of generated gas was 0.2 ppm and an amount of generated moisture was 0.0 ppm.

COMPARATIVE PACKAGING MATERIAL

A 25 μm thick low density polyethylene (LDPE) (available from AICELLO CHEMICAL CO., LTD.) was used as Comparative Packaging Material. The number of fine particles of Comparative Packaging Material was 7,000/cm$^2$, a steam permeation degree was 36.0 g/cm$^2$·24 hr, an amount of generated gas was 6.2 ppm and an amount of generated moisture was 15.2 ppm.

EXAMPLE 1

An O-ring (AS-568A-214) made of tetrafluoroethylene-perfluoro (methyl vinyl ether) copolymer was dipped in a solution of a 1:1 mixture of sulfuric acid and hydrogen peroxide at 100° C. for 15 minutes for cleaning and was subjected to Soxhlet extraction cleaning at 100° C. with ultra pure water which has a metal content of not more than 1.0 ppm and does not contain more than 300 fine particles of not less than 2 μm and then drying at 200° C. for 24 hours to give a clean O-ring, in which the number of fine particles of not less than 0.2 μm is 48,000/cm$^2$. An amount of moisture generated from the obtained O-ring was 128 ppm and an amount of generated gas was 0.9 ppm.

The O-ring was put between two Packaging Materials 1 and then packaged and sealed with an ultrasonic sealing machine (Ultrasonic Plastic Welder 35 KHZ RINCO Ultrasonics AG available from RINCO CO., LTD.). The packaged O-ring was allowed to stand in an atmosphere of 40° C. and 90% RH for 24 hours. Then the package was unsealed and the O-ring was taken out. The number of fine particles, an amount of moisture generation and an amount of gas generation were measured. Also percentages of an increase in the number of fine particles, an amount of moisture generation and an amount of gas generation were calculated as compared with those before packaging and sealing. The results are shown in Table 1.

EXAMPLES 2 to 8

Sealing of O-ring, allowing it to stand and unsealing were carried out in the same manner as in Example 1 except that Packaging Materials 2 to 8 were used respectively. Then the number of fine particles, an amount of moisture generation and an amount of gas generation were measured and percentages of increase thereof were calculated. The results are shown in Table 1.

In cases of Example 2 (Packaging Material 2), Example 5 (Packaging Material 5) and Example 6 (Packaging Material 6), in which the packaging materials made of PET were used, packages were sealed by ultrasonic sealing in the same manner as in Example 1, and in cases of Example 3 (Packaging Material 3), Example 4 (Packaging Material 4), Example 7 (Packaging Material 7) and Example 8 (Packaging Material 8), in which the packaging materials made of PCTFE were used, packages were heat-sealed at 160° C. with a heat-seal machine (FI-600 available from Fuji Impulse Co., Ltd.). In cases of films (Packaging Materials 5 and 7) subjected to vapor deposition and laminated films (Packaging Materials 6 and 8), sealing was carried out so that the vapor deposition side and laminated side being faced to the outside.

EXAMPLE 9

The O-ring (AS-568A-214) cleaned in the same manner as in Example 1 was sealed by ultrasonic sealing by using Packaging Material 2 and further Packaging Material 5, thus being packaged double. The packaged O-ring was allowed to stand and unsealed in the same manner as in Example 1. Then the number of fine particles, an amount of moisture generation and an amount of gas generation were measured and percentages of increase thereof were calculated. The results are shown in Table 1.

EXAMPLE 10

The O-ring (AS-568A-214) cleaned in the same manner as in Example 1 was sealed by ultrasonic sealing by using Packaging Material 2 in a high purity nitrogen gas stream and further Packaging Material 5 in a high purity nitrogen gas stream, thus being packaged double. The packaged O-ring was allowed to stand and unsealed in the same manner as in Example 1. Then the number of fine particles, an amount of moisture generation and an amount of gas generation were measured and percentages of increase thereof were calculated. The results are shown in Table 1.

COMPARATIVE EXAMPLE 1

Heat-sealing was carried out in the same manner as in Example 3 (PCTFE) by using Comparative Packaging Material (LDPE). The package was allowed to stand and unsealed in the same manner as in Example 1. Then the number of fine particles, an amount of moisture generation and an amount of gas generation were measured and percentages of increase thereof were calculated. The results are shown in Table 1.

TABLE 1

| | Number of fine particles | | Amount of moisture generation | | Amount of gas generation | |
|---|---|---|---|---|---|---|
| | /cm$^2$ | Percentage of increase (%) | ppm | Percentage of increase (%) | ppm | Percentage of increase (%) |
| Ex. 1 | 95,000 | 98 | 250 | 95 | 1.2 | 33 |
| Ex. 2 | 59,000 | 23 | 250 | 95 | 1.2 | 33 |
| Ex. 3 | 98,000 | 104 | 200 | 56 | 1.4 | 56 |
| Ex. 4 | 65,000 | 25 | 200 | 56 | 1.4 | 56 |
| Ex. 5 | 110,000 | 129 | 180 | 41 | 1.2 | 33 |
| Ex. 6 | 104,000 | 117 | 150 | 17 | 1.2 | 33 |
| Ex. 7 | 113,000 | 135 | 180 | 41 | 1.4 | 56 |
| Ex. 8 | 107,000 | 123 | 150 | 17 | 1.4 | 56 |
| Ex. 9 | 59,000 | 23 | 160 | 25 | 1.0 | 33 |
| Ex. 10 | 49,000 | 2 | 130 | 2 | 1.0 | 11 |
| Com. Ex. 1 | 260,000 | 442 | 400 | 213 | 7.4 | 722 |

As it is evident from Table 1, products packaged with Packaging Materials of the present invention can be kept clean. Particularly in case of packaging double in the presence of high purity gas, almost the same cleanliness as that just after cleaning (at packaging) can be maintained.

INDUSTRIAL APPLICABILITY

The packaging material of the present invention can minimize contamination by a packaging material itself (adhering fine particles), contamination coming from outside environment (moisture permeation) and contamination resulting from material of a packaging material (generation of gas and moisture), and makes it possible to store and transport a product with maintaining cleanliness thereof after cleaning. The packaging material can be suitably used particularly for packaging of parts such as sealing materials for semiconductor production apparatuses which are required to have very high cleanliness.

What is claimed is:

1. A method for packaging molding materials or parts for semiconductor production apparatuses, which comprises packaging a molding material or part for semiconductor production apparatuses in a packaging material, in which said packaging material has a total amount of gas (excepting steam) generated when heating at 80° C. for 15 minutes of not more than 5 μg/1 g of the packaging material and a total amount of moisture generated when heating at 80° C. for 30 minutes is not more than 13 μg/1 g of the packaging material.

2. The method for packaging of claim 1, which comprises packaging a part for semiconductor production apparatuses selected from the group consisting of an O-ring, square ring, gasket, packing, oil seal, bearing seal, lip seal, diaphragm, hose, tube, wafer carrier and rubber roll.

3. The method for packaging of claim 1, which comprises packaging a molding material comprising unvulcanized rubber.

4. The method for packaging of claim 1, which comprises packaging an unvulcanized kneaded composition selected from the group consisting of unvulcanized fluorine-containing elastomer and unvulcanized silicone elastomer.

5. The method for packaging of claim 1, wherein said part for semiconductor production apparatuses is selected from the group consisting of an O-ring, square ring, gasket, packing, oil seal, bearing seal, lip seal, diaphragm, hose, tube, wafer carrier and rubber roll.

6. The method for packaging of claim 1, in which said packaging material has a number of fine particles having a particle size of not less than 0.2 μm and being present on the surface of the packaging material facing a molding material or part for semiconductor production apparatuses to be packaged of not more than 5,000/cm².

7. The method for packaging of claim 1, in which said packaging material has a steam permeation degree at 40° C. and 90% RH of not more than 30 g/cm²·24 hr.

8. A packaged article with a packaging material enclosing or overlaying said article, wherein said article is a molding material or part for semiconclklclor production apparatuses, and said packaging material has a total amount of gas (excepting steam) generated when heating at 80° C. for 15 minutes of not more than 5 μg/1 g of the packaging material and a total amount of moisture generated when heating at 80° C. for 30 minutes is not more than 13 μg/1 g of the packaging material.

9. The packaged article of claim 8, wherein said molding material comprises unvulcanized rubber.

10. The packaged molding material of claim 8, wherein said molding material is an unvulcanized kneaded composition selected from the group consisting of unvulcanized fluorine-containing elastomer and unvulcanized silicone elastomer.

11. The packaged article of claim 8, a wherein said part for semiconductor production apparatuses is selected from the group consisting of an O-ring, square ring, gasket, packing, oil seal, bearing seal, lip seal, diaphragm, hose, tube, wafer carrier and rubber roll.

12. The method for packaging of claim 8, wherein said part for semiconductor production apparatuses is selected from the group consisting of an O-ring, square ring, gasket, packing, oil seal, bearing seal, lip seal, diaphragm, hose, tube, wafer carrier and rubber roll.

13. A method for packaging molding materials or parts for semiconductor production apparatuses, which comprises packaging a molding material or part for semiconductor production apparatuses in a packaging material, so that when the molding material or part for semiconductor production apparatuses is sealed in the packaging material. allowed to stand for 24 hours in an environment of 40° C. and 90% RH and then unpacked, the packaged molding material or part for semiconductor production apparatuses has a property that a percentage of an increase in the number of fine particles having a particle size of not less than 0.2 μm and being present on the surface of the molding materials or parts is not more than 150%, that a percentage of an increase in an amount of water generated when heating the molding materials or parts at 300° C. for 30 minutes is not more than 100%, and that a percentage of an increase in a total amount of gas (excepting steam) generated when heating them at 200° C. for 15 minutes is not more than 100%, wherein said packaging material has a total amount of gas (excepting steam) generated when heating at 80° C. for 15 minutes of not more than 5 μg/1 g of the packaging material and a total amount of moisture generated when heating at 80° C. for 30 minutes is not more than 13 μg/1 g of the packaging material.

* * * * *